United States Patent
Kamiya et al.

(10) Patent No.: US 8,741,460 B2
(45) Date of Patent: Jun. 3, 2014

(54) LITHIUM ION SECONDARY BATTERY

(75) Inventors: Masato Kamiya, Anjo (JP); Taira Saito, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/285,096

(22) Filed: Oct. 31, 2011

(65) Prior Publication Data
US 2012/0077065 A1    Mar. 29, 2012

Related U.S. Application Data

(63) Continuation of application No. PCT/JP2010/072001, filed on Dec. 8, 2010.

(51) Int. Cl.
*H01M 4/00* (2006.01)

(52) U.S. Cl.
USPC .................................. 429/94; 429/231.95

(58) Field of Classification Search
USPC .................. 429/94, 96, 99, 231.95
See application file for complete search history.

(56) References Cited

U.S. PATENT DOCUMENTS

2010/0015510 A1*  1/2010  Tanaka et al. ............ 429/94
2012/0070705 A1*  3/2012  Kim .......................... 429/61

FOREIGN PATENT DOCUMENTS

| JP | 2001-38475 | 2/2001 |
| JP | 2002-8708 | 1/2002 |
| JP | 2004-47332 | 2/2004 |
| JP | 2009-26705 | 2/2009 |
| JP | 2009-170137 | 7/2009 |
| JP | 2010-129450 | 6/2010 |

* cited by examiner

*Primary Examiner* — Mark F Huff
*Assistant Examiner* — Monique Wills
(74) *Attorney, Agent, or Firm* — Finnegan, Henderson, Farabow, Garrett & Dunner, LLP

(57) ABSTRACT

A lithium ion secondary battery includes a flat-shaped electrode wound body. Positive and negative terminals are connected respectively to the body and placed to partially protrude from a battery lid. Assuming that the body length in a winding axial direction is W, the body size in a direction perpendicular to the axial direction and parallel to the flat surfaces is H, and a distance between a farthest position in a connecting range of one of the terminals, in which the terminal is connected to an uncoated portion, from the lid and the body edge located on the lid side is X, the values W, H, and X are determined so that a point defined in a plane (X/H, H/W) by values (X/H) and (H/W) is located in a triangle defined by joining three points, (0.50, 0.70), (0.32, 0.40), and (0.70, 0.40) in the same plane.

6 Claims, 3 Drawing Sheets

LITHIUM ION SECONDARY BATTERY

CROSS-REFERENCE TO RELATED APPLICATIONS

This application is a continuation application based upon and claims the benefit of the prior PCT International Patent Application No. PCT/JP2010/072001 filed on Dec. 8, 2010, the entire contents of which are incorporated herein by reference.

TECHNICAL FIELD

The present invention relates to a lithium ion secondary battery including a flat rectangular-shaped electrode wound body and more particularly to a lithium ion secondary battery in which positive and negative terminals are fixed to current collectors of an electrode wound body by welding.

BACKGROUND ART

Heretofore, there is known such a secondary battery including a flat electrode wound body as disclosed in Patent Document 1 for example. This electrode wound body includes electrode plates in each of which a current collector made of a metal foil is coated with an electrode active material, excepting a part of the foil in its width direction. Positive and negative electrode plates and separators are wound together in overlapping relation, forming the electrode wound body. Further, in this electrode wound body, a positive current collector is connected to a positive terminal and a negative current collector is connected to a negative terminal is connected, respectively. Patent Document 1 discloses an electrode wound body in which flat-plate-like electrode terminals are connected respectively to current collectors by welding.

When a secondary battery is charged and discharged, a certain degree of heat is generated in the secondary battery. If that heat stays inside the secondary battery, it is undesirable because it may decrease electric performance of the battery. In the secondary battery, therefore, the heat generated in the electrode wound body is allowed to transfer from the current collectors to the outside of the battery via the electrode terminals. There is also another secondary battery in which a heat radiating member or the like is placed on the outside of a battery case.

For instance, in a lithium ion secondary battery, preferably, a current collector and an electrode terminal for positive electrode are both made of aluminum and a current collector and an electrode terminal for negative electrode are both made of copper. In the positive electrode, accordingly, the aluminum current collector and the aluminum electrode terminal are connected. For this connection, ultrasonic welding is used in many cases. In the negative electrode, on the other hand, the copper current collector and the copper electrode terminal are connected. For this connection, therefore, resistance welding is used in many cases. Accordingly, the heat generated in the battery will be transferred to the electrode terminals via their weld portions.

RELATED ART DOCUMENTS

Patent Documents

Patent Document 1: JP2009-026705A

DISCLOSURE OF THE INVENTION

Problems to be Solved by the Invention

However, even though the above configurations are adopted, there remains a problem with the heat being apt to stay in the secondary battery. The causes thereof may include that the area of the weld portion in a heat transfer path from inside to outside of the battery is not so large. However, increasing the area of the weld portion is not so appropriate because it may disturb space saving of the battery and others. Consequently, there is a demand to effectively release the heat generated in the inside of the electrode wound body without increasing the welding area.

The present invention has been made to solve the above problems inherent in the conventional secondary battery and has a purpose to provide a lithium ion secondary battery in which a current collector and an electrode terminal are connected to each other by welding so that the heat of an electrode wound body can be efficiently transferred to the electrode terminal.

Means of Solving the Problems

To achieve the above purpose, one aspect of the invention provides a lithium ion secondary battery comprising an electrode wound body including: a positive electrode plate in which a positive current collector is partially applied with a positive-electrode material mixture layer and has a positive-electrode uncoated portion on one end side in which the positive-electrode material mixture layer is not applied, and a remaining portion is a positive-electrode coated portion applied with the positive-electrode material mixture layer; a negative electrode plate in which a negative current collector is partially applied with a negative-electrode material mixture layer and has a negative-electrode uncoated portion on one end side in which the negative-electrode material mixture layer is not applied, and a remaining portion is a negative-electrode coated portion applied with the negative-electrode material mixture layer; and a separator for insulating the positive electrode plate and the negative electrode plate, the positive electrode plate, the negative electrode plate, and the separator being wound in a flat form so that the positive-electrode uncoated portion and the negative-electrode uncoated portion protrude in opposite directions to each other, and the electrode wound body being sealed together with an electrolyte in a battery case, wherein the lithium ion secondary battery includes: a positive terminal connected to the positive-electrode uncoated portion; and a negative terminal connected to the negative-electrode uncoated portion, the battery case has a flat rectangular shape in which one surface is a lid portion and two of surfaces excepting the lid portion are flat surfaces having a larger area than the other surfaces, the positive terminal and the negative terminal are placed to penetrate through the lid portion to partially protrude outside, assuming that a length of the electrode wound body in a winding axis direction is W, a size of the electrode wound body in a direction perpendicular to the winding axis direction and parallel to the flat surfaces is H, and a distance between a farthest position in a connecting range of at least one of the positive terminal and the negative terminal, in which the terminal is connected to the uncoated portion, from the lid portion and an edge of the electrode wound body on a side of the lid portion is X, the values W, H, and X are determined so that a point defined in a plane (X/H, H/W) by a value (X/H) and a value (H/W) is located in a triangular region defined by joining three points, (0.50, 0.70), (0.32, 0.40), and (0.70, 0.40) in the same plane.

According to the lithium ion secondary battery in the above aspect, the size of the electrode wound body wound in a flat shape and the connecting position of the positive terminal or negative terminal connected to the electrode wound body are determined in the above manner. It is found that when the values W, H, and X are determined so that the value (X/H) and the value (H/W) fall within this triangular region, a lithium ion secondary battery can efficiently release the heat generated in the electrode wound body. The lithium ion secondary battery in the above aspect can therefore dissipate the heat efficiently.

In the above configuration, preferably, a battery capacity is 3 to 30 Ah, X/H is 0.3 to 0.4 or 0.6 to 0.7, and the value H is in a range of 40 mm≤H≤90 mm.

In the above configuration, preferably, a battery capacity is 3 to 30 Ah, X/H is 0.4 to 0.6, and the value H is in a range of 45 mm≤H≤120 mm.

In the above configuration, preferably, the value H is in a range of 45 mm≤H≤90 mm.

In one of the above configurations, preferably, the positive terminal and the positive current collector are made of aluminum or aluminum alloy, the negative terminal and the negative current collector are made of copper or copper alloy, the positive terminal and the positive-electrode uncoated portion are connected by ultrasonic welding, and the negative terminal and the negative-electrode uncoated portion are connected by resistance welding.

Effects of the Invention

According to the lithium ion secondary battery in the aforementioned aspect of the invention, a current collector and an electrode terminal are connected to each other by welding and the heat of an electrode wound body can be efficiently transferred to the electrode terminal.

MODE FOR CARRYING OUT THE INVENTION

A detailed description of a preferred embodiment of the present invention will now be given referring to the accompanying drawings. In the present embodiment, the invention is applied to a flat rectangular-shaped lithium ion secondary battery.

Figure 1:
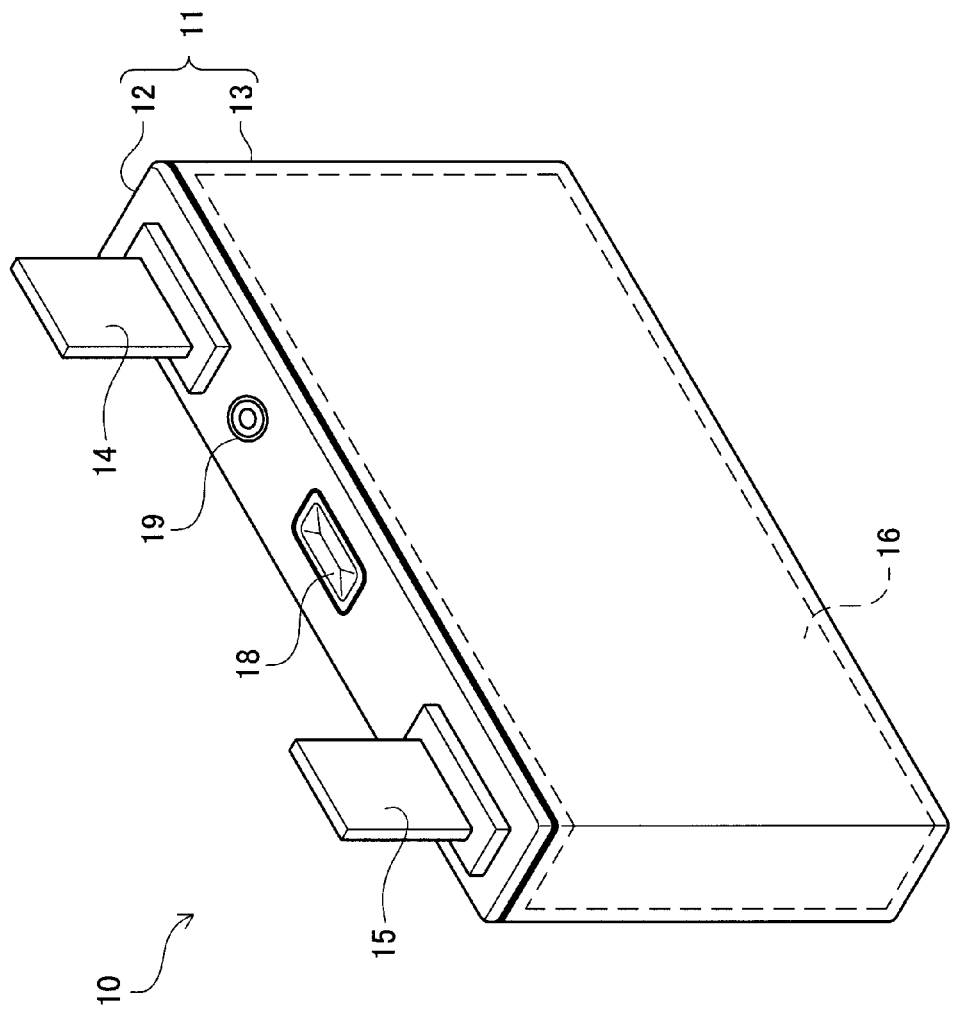
FIG. 1 is a schematic perspective view showing a secondary battery in an embodiment.

A secondary battery in the present embodiment includes a flat rectangular-shaped battery case 11 as shown in FIG. 1. This battery case 11 consists of an almost plate-like lid 12 and a case body 13 which are welded to each other. To the lid 12, a positive terminal 14 and a negative terminal 15 are attached to protrude from an upper surface of the lid 12 in the figure. In the case body 13, a power generating element 16 is housed. The positive terminal 14 and the negative terminal 15 are connected respectively to the power generating element 16 inside the case body 13. Further, the lid 12 is provided with a safety valve 18 and a liquid port 19 between the terminals 14 and 15.

Figure 2:
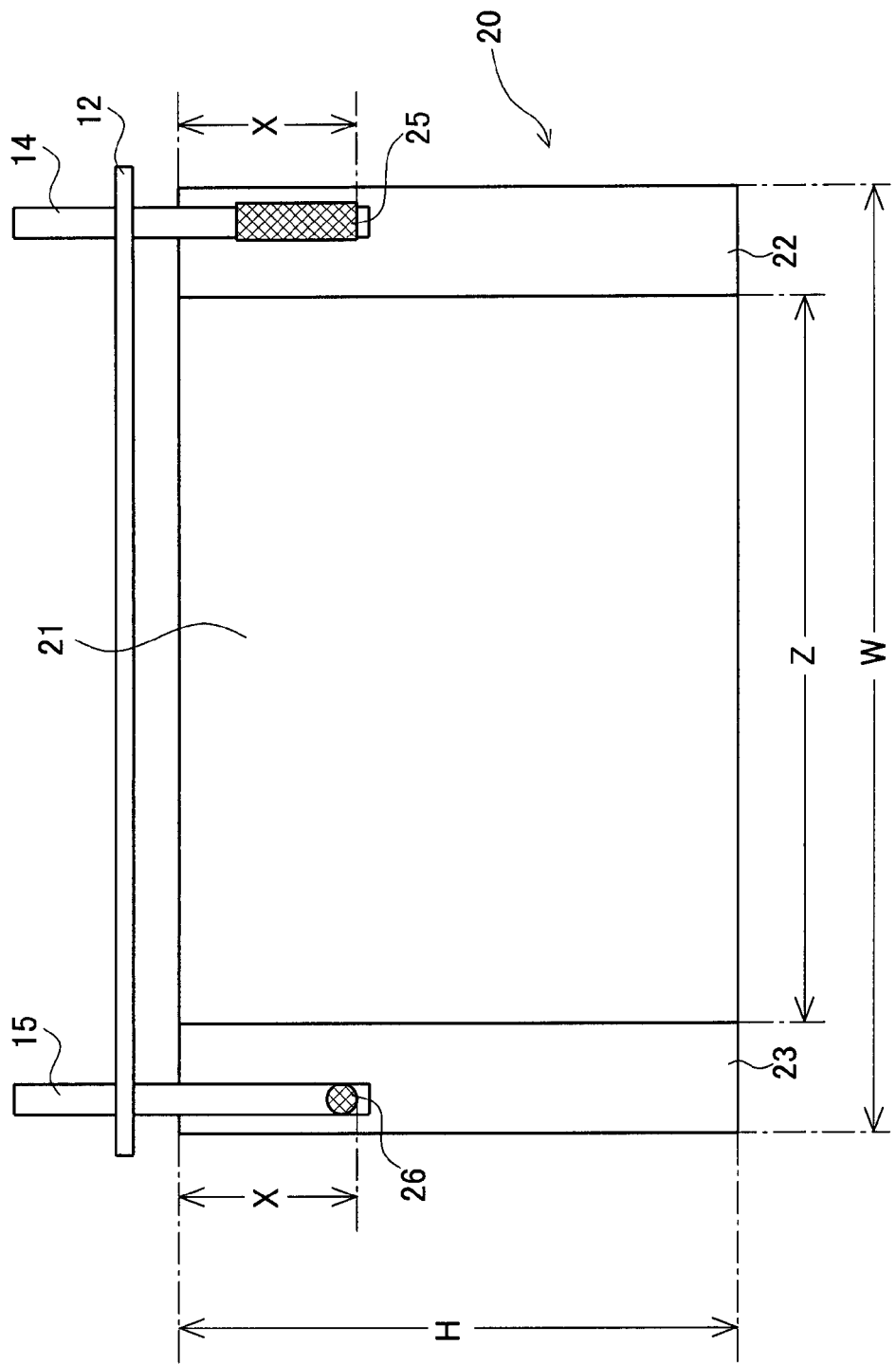
FIG. 2 is an explanatory view showing a wound body in the embodiment.

The power generating element 16 in the present embodiment includes a wound body 20 shown in FIG. 2 and electrolyte. The wound body 20 in this embodiment is a wound body made of strip-shaped electrode plates wound in a flat form. The winding axis is a line or plane in a lateral direction in the figure. Each electrode plate is made of a strip-shaped metal foil coated with an electrode active material, excepting one end side of the foil in its width direction (a lateral direction in the figure). The wound body 20 is made in such a way that a positive electrode plate and a negative electrode plate are placed with their coated ranges being overlapped and wound together while interposing separators therebetween.

In the wound body 20 in the present embodiment, as shown in FIG. 2, uncoated portions of the electrode plates are located outside on opposite sides in the width direction for the positive electrode and the negative electrode. These uncoated portions form current collecting portions for respective electrodes. In other words, the wound body 20 includes a coated portion 21 at the center in the lateral direction in the figure, a positive current collecting portion 22 at the right, and a negative current collecting portion 23 at the left.

As shown in FIG. 2, the positive terminal 14 is connected to the positive current collecting portion 22 and the negative terminal 15 is connected to the negative current collecting portion 23, respectively. In this embodiment, the positive terminal 14 is welded at a weld portion 25 by ultrasonic welding. The negative terminal 15 is welded at a weld portion 26 by resistance welding. In the figure, a connecting range which is a weld region of each of the weld portion 25 and the weld portion 26 is indicated by hatching.

Accordingly, as shown in FIG. 2, the weld portion 25 of the positive terminal 14 has a larger area than the weld portion 26 of the negative terminal 15. In the present embodiment, the weld portions 25 and 26 are positioned so that their ends (lower ends in the figure) located on a far side from a protruding end of the corresponding terminal from the battery case 11 are on almost the same level. The distance between the lower end of the weld portion 25 and an upper edge of the wound body 20 is equal to the distance between the lower end of the weld portion 26 and the upper edge of the wound body 20. Hereinafter, this distance is referred to as a weld depth X. The plane of the wound body 20 in the present embodiment shown in this figure has a larger area than other planes and an almost rectangular shape defined by width W×height H. Of the width W, a range of the coated portion 21 is referred to as a width Z.

The present inventors found that a relationship between this weld depth X, the width W of the wound body 20, and the height H of the wound body 20 plays an important role in the heat dissipation or radiation characteristics from the electrode terminals. It was found that as both a horizontal-to-vertical ratio (H/W) of the wound body 20 and a ratio of the weld depth X of each electrode terminal to the height H of the wound body 20 (X/H) are closer to 0.5, the heat dissipation characteristic is more superior. Further, the inventors also found by an experiment that as long as both X/H and H/W are in respective predetermined ranges, the heat dissipation characteristic of the secondary battery 10 falls within a permissible range.

The details of this experiment will be explained below. For this experiment, the inventors manufactured a plurality of secondary batteries by variously changing the horizontal-to-vertical ratio (H/W) of the wound body 20 and the ratio (X/H) of the weld depth X of each electrode terminal to the height H of the wound body 20. In each of the secondary batteries, however, the materials of the positive electrode plate and the negative electrode plate, the battery capacity, the material of electrolyte, the materials and sizes of the negative terminal and the positive terminal, and connecting manners of the positive terminal and the negative terminal are respectively the same. To be concrete, the inventors manufactured the secondary batteries under the following conditions.

The positive electrode plate used in each of the secondary batteries is manufactured in such a manner that a coating material prepared by mixing a conductive material and a binding material into $LiNi_{0.33}Co_{0.33}Mn_{0.33}O_2$ is applied onto an aluminum foil. The negative electrode plate is manufactured in such a way that a coating material prepared by mixing a viscosity increasing agent and a binding material with graphite as a main constituent is applied onto a copper foil. The electrolyte in each secondary battery is prepared by dissolving $LiPF_6$ in a mixed solvent of ethylene carbonate (EC), ethyl methyl carbonate (EMC), and dimethyl carbonate (DMC).

The positive terminal 14 used in each secondary battery is an aluminum component. The positive terminal 14 is connected to the positive current collecting portion 22 of the wound body 20 by ultrasonic welding. The area of the weld portion 25 was 50 mm$^2$. The negative terminal 15 used in each secondary battery is a copper component. The negative terminal 15 is connected to the negative current collecting portion 23 of the wound body 20 by resistance welding. The area of the weld portion 26 was 20 mm$^2$.

Moreover, as the separators, the inventors prepared a three-layer separator formed in three layers; polypropylene (PP), polyethylene (PE), and PP, and a single-layer separator formed in one layer; PE. Those separators each start contraction or shrinkage at a temperature of about 150° C. Examples 1 to 7 and Comparative examples 1 to 8 mentioned later are experimental results on the secondary batteries manufactured by using the three-layer separators each including the PP/PE/PP layers. Examples 8 to 10 and Comparative examples 9 to 11 are experimental results on the secondary batteries using the single-layer separators each including the PE layer. In the experiments, significant differences in heat dissipation characteristics were not found between secondary batteries provided with different types of separators.

The inventors further determined the area of the whole positive electrode plate and the area of the whole negative electrode plate to set the battery capacity of each secondary battery to 4 Ah. Further, combinations of H and W were determined so that values of H×W of the wound bodies 20 are equal. Accordingly, the wound bodies 20 of the secondary batteries manufactured in the experiment had the same thickness. In each of the secondary batteries, the relationship between the width W of the wound body 20 and the width Z of the coated portion 21 was Z/W=0.72. In this experiment, the inventors manufactured a plurality of secondary batteries with various values of X/H and H/W by changing X, H, and W as shown in Table mentioned later.

The inventors charged the manufactured secondary batteries up to an overcharge state and investigated a subsequent state of each battery. As to the lithium ion secondary battery, it has been found that heat is generated in the battery by charge and discharge. In particular, when the battery is charged to the overcharge state, the internal temperature of the battery becomes higher than in normal use. If a secondary battery subjected to the experiment do not have appropriate heat dissipation characteristics, this heat stays in the battery, causing contraction or the like of the separator. When the separator contracts, an insulating failure between the positive electrode plate and the negative electrode plate occurs at such a contraction site. In the secondary battery having inferior heat dissipation characteristics, the battery capacity will decrease due to charging to the overcharge state. Therefore, by measuring discharge voltage of the secondary battery after charged to the overcharge state, it is possible to determine whether or not contraction of the separator has occurred.

The inventors therefore carried out the following experiment on each secondary battery manufactured as above. The inventors charged the manufactured secondary batteries respectively by a charge device capable of outputting up to an upper limit voltage of 10V at a current of 55 A under an ambient temperature of 60° C. This upper limit voltage exceeds an adequate full charge voltage of this secondary battery. Thus, if charging is continued by this charge device, the secondary battery reaches an overcharge state. The secondary batteries manufactured in this experiment each had a voltage rating of 3.5V.

After charging for 60 minutes by the charge device, the inventors detached the secondary batteries from the charge device and measured output voltage of the secondary batteries. After the secondary batteries having good heat dissipation characteristics are detached from the charge device, output voltages of the batteries are 3.5 V or more. The results thereof are Examples 1 to 10 shown in the following Table 1. On the other hand, output voltages of the secondary batteries having inferior heat dissipation characteristics are for example 2.5 V or less. The results thereof are Comparative examples 1 to 11 shown in the following Table 2.

TABLE 1

|  | Weld depth ratio (X/H) | Horizontal-to-vertical ratio (H/W) | Weld depth ratio X (mm) | Height H (mm) | Width W (mm) | Voltage after overcharge test (V) |
|---|---|---|---|---|---|---|
| Ex. 1 | 0.50 | 0.60 | 52.0 | 103.9 | 173.2 | 4.31 |
| Ex. 2 | 0.50 | 0.40 | 42.4 | 84.9 | 212.1 | 3.99 |
| Ex. 3 | 0.50 | 0.70 | 56.1 | 112.2 | 160.4 | 3.89 |
| Ex. 4 | 0.70 | 0.40 | 59.4 | 84.9 | 212.1 | 4.01 |
| Ex. 5 | 0.32 | 0.40 | 27.2 | 84.9 | 212.1 | 3.65 |
| Ex. 6 | 0.40 | 0.50 | 37.9 | 94.9 | 189.7 | 3.78 |
| Ex. 7 | 0.60 | 0.50 | 56.9 | 94.9 | 189.7 | 4.11 |
| Ex. 8 | 0.50 | 0.70 | 56.1 | 112.2 | 160.4 | 3.77 |
| Ex. 9 | 0.70 | 0.40 | 59.4 | 84.9 | 212.1 | 4.10 |
| Ex. 10 | 0.32 | 0.40 | 27.2 | 84.9 | 212.1 | 3.66 |

Ex.: Example

TABLE 2

| | Weld depth ratio (X/H) | Horizontal-to-vertical ratio (H/W) | Weld depth ratio X (mm) | Height H (mm) | Width W (mm) | Voltage after overcharge test (V) |
|---|---|---|---|---|---|---|
| CEX. 1 | 0.50 | 0.32 | 37.9 | 75.9 | 237.2 | 2.31 |
| CEX. 2 | 0.32 | 0.32 | 24.3 | 75.9 | 237.2 | 1.88 |
| CEX. 3 | 0.32 | 0.50 | 30.4 | 94.9 | 189.7 | 1.77 |
| CEX. 4 | 0.32 | 0.70 | 36.0 | 112.4 | 160.1 | 2.01 |
| CEX. 5 | 0.50 | 0.90 | 63.6 | 127.3 | 141.4 | 2.10 |
| CEX. 6 | 0.70 | 0.70 | 78.6 | 112.2 | 160.4 | 1.45 |
| CEX. 7 | 0.70 | 0.50 | 66.4 | 94.9 | 189.7 | 1.91 |
| CEX. 8 | 0.70 | 0.32 | 53.6 | 76.4 | 235.7 | 1.56 |
| CEX. 9 | 0.50 | 0.32 | 37.9 | 75.9 | 237.2 | 2.41 |
| CEX. 10 | 0.32 | 0.50 | 30.4 | 94.9 | 189.7 | 1.58 |
| CEX. 11 | 0.70 | 0.50 | 66.4 | 94.9 | 189.7 | 1.92 |

CEX.: Comparative Example

Figure 3:
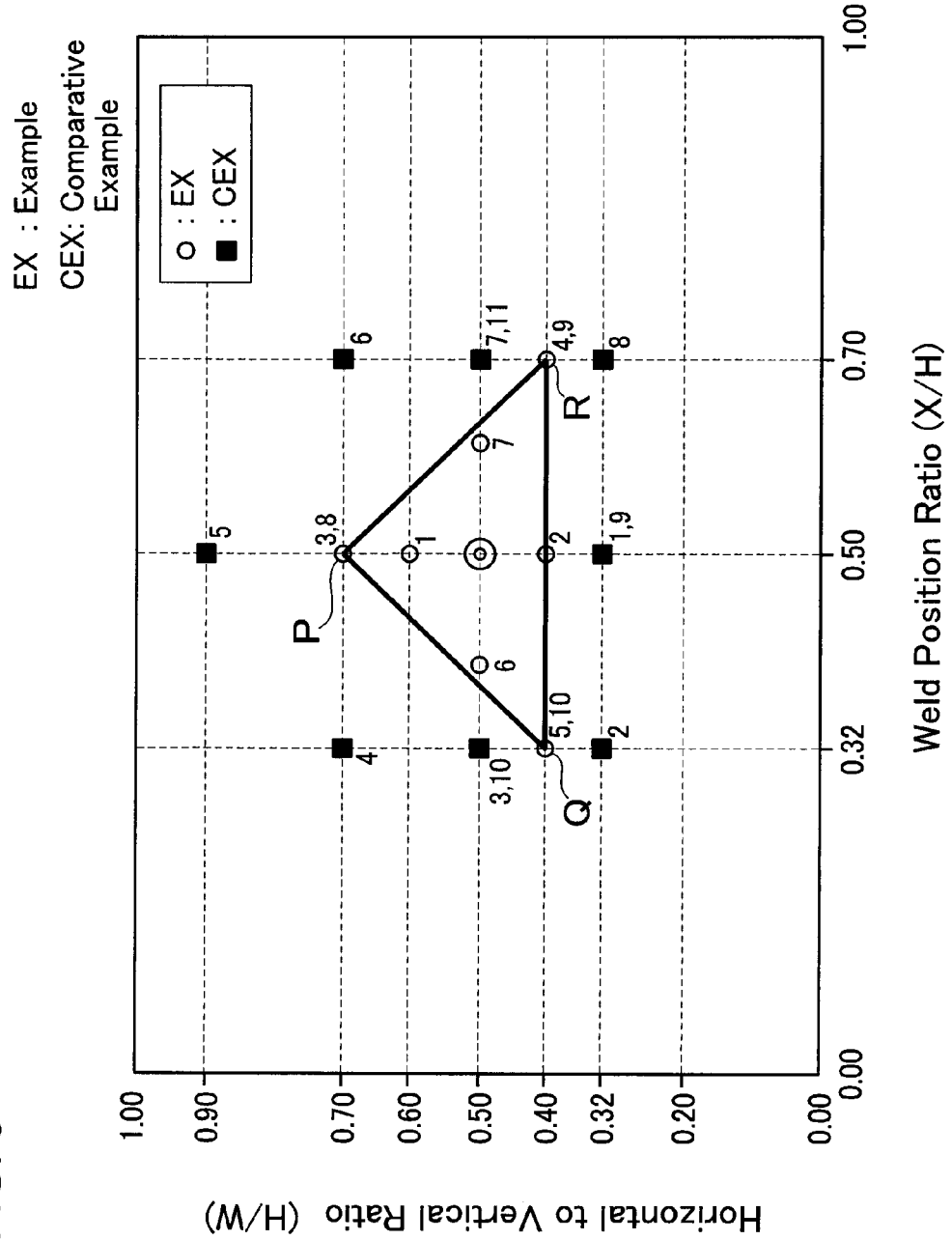
FIG. 3 is a graph showing a permissible range of weld depth and a horizontal to vertical ratio.

The results of this experiment are shown in above Tables 1 and 2 and a graph in FIG. 3. In Tables 1 and 2, the rightmost column entitled "Voltage (V) after overcharge test" corresponds to the aforementioned output voltage. The secondary batteries that outputted a voltage of 3.5 V or more are determined to have good heat dissipation characteristics. Examples 1 to 10 are good. The secondary batteries that outputted the "voltage (V) after overcharge test" of 2.5 V or less are determined to have poor heat dissipation characteristics. Comparative Examples 1 to 11 are not good.

FIG. 3 is a graph with a weld position ratio (X/H) on the horizontal axis and a horizontal-to-vertical ratio (H/W) on the vertical axis to show the points of (X/H, H/W) in Examples and Comparative Examples. Examples 1 to 10 are indicated by circular marks in the graph. Comparative Examples 1 to 11 are indicated by rectangular marks in the graph. The numbers assigned to the marks in the graph correspond respectively to the example numbers disclosed in Tables 1 and 2 shown above. As is clear from this graph, the points (X/H, H/W) of the secondary batteries having good heat dissipation characteristics are dispersed within in the triangular region defined in the graph by three points; i.e., a point P (0.50, 0.70), a point Q (0.32, 0.40), and a point R (0.70, 0.40). In particular, at each of these three apexes, a point (X/H, H/W) representing a good secondary battery is present. Specifically, in any of the good secondary batteries, the weld depth ratio (X/H) is in a range of 0.32 or more to 0.70 or less.

The inventors further manufactured other secondary batteries with different heights H from those in the aforementioned examples under the condition that the point (X/H, H/W) is at the point P, Q, or R of the apexes of the aforementioned triangular region. These secondary batteries were also set to a battery capacity of 4 Ah. Accordingly, the wound bodies 20 are different in H×W value from those in the aforementioned Examples and thus the winding thickness is also different. Other parameters and materials of components are the same as those in the aforementioned Examples. The secondary batteries manufactured with different heights H in a range of 30 mm to 130 mm were subjected to a similar experiment. Experimental results thereof are shown in following Table 3.

P, Q, and R in the left column in Table 3 represent the shapes corresponding to the aforementioned points. To be concrete, they are defined as follows:
P: (X/H, H/W) (0.50, 0.70), equal to Examples 3 and 8
Q: (X/H, H/W)=(0.32, 0.40), equal to Examples 5 and 10
R: (X/H, H/W)=(0.70, 0.40), equal to Examples 4 and 9
"Voltage (V)" in Table 3 is synonymous with "Voltage (V) after overcharge test" in Tables 1 and 2.

TABLE 2

| | | Height (mm) | | | | | | | |
|---|---|---|---|---|---|---|---|---|---|
| | | 30 | 40 | 45 | 85 | 90 | 100 | 120 | 130 |
| Voltage (V) | P | 0.99 | 1.26 | 3.79 | 4.11 | 4.50 | 3.79 | 3.78 | 1.44 |
| | Q | 1.78 | 3.88 | 4.31 | 4.57 | 4.32 | 1.22 | 1.30 | 0.48 |
| | R | 1.11 | 3.89 | 4.36 | 3.79 | 3.98 | 1.70 | 1.61 | 0.14 |

Similar to the experiments in Tables 1 and 2, the batteries that provide the voltage (V) of 3.5 V or more in Table 3 are also good secondary batteries. As found from this Table 3, accordingly, the secondary batteries whose heights H are within the following ranges had good heat dissipation characteristics.
Shape P: 45≤H≤120 (mm)
Shape Q: 40≤H≤90 (mm)
Shape R: 40≤H≤90 (mm)

In the present invention, consequently, in the case of the secondary battery(s) having a battery capacity of 4 Ah, at least the height H of the wound body 20 is demanded to fall in a range of 40≤H≤120 (mm). Further, in the case of the height in a range of 45≤H≤90 (mm), the effect could be obtained irrespective of the shapes. In this Table, the experiments show data on only the secondary batteries with a battery capacity of 4 Ah. However, it was confirmed that any secondary batteries with a battery capacity of 3 to 30 Ah exhibited the same tendency. It was also confirmed that even when X/H was increased or decreased by about 0.1 from each point P, Q, or R mentioned above, the same tendency was found.

According to the secondary battery 10 of the present invention explained in detail above, the outer shape of the wound body 20 is designed so that the value (X/H, H/W) is within a range surrounded by lines joining the point P (0.50, 0.70), the point Q (0.32, 0.40), and the point R (0.70, 0.40). Accordingly, even when the heat is generated inside due to overcharge or the like, the heat is dissipated appropriately through the positive and negative terminals. That is, the secondary battery 10 is superior in heat dissipation characteristics. There is therefore no possibility of a short circuit due to contraction or melting of the separator. Consequently, the secondary battery in which the current collectors and the electrode terminals are connected to each other by welding can efficiently transfer the heat of the electrode wound body to the electrode terminals.

The above embodiment is a mere example and does not restrict the present invention. The present invention may be embodied in other specific forms without departing from the essential characteristics thereof.

DESCRIPTION OF THE REFERENCE SIGNS

10 Secondary battery
11 Battery case
12 Lid
14 Positive terminal
15 Negative terminal
20 Wound body
22 Positive current collecting portion
23 Negative current collecting portion
25 Weld portion
26 Weld portion

The invention claimed is:

1. A lithium ion secondary battery comprising an electrode wound body including: a positive electrode plate in which a positive current collector is partially applied with a positive-electrode material mixture layer and has a positive-electrode uncoated portion on one end side in which the positive-electrode material mixture layer is not applied, and a remaining portion is a positive-electrode coated portion applied with the positive-electrode material mixture layer; a negative electrode plate in which a negative current collector is partially applied with a negative-electrode material mixture layer and has a negative-electrode uncoated portion on one end side in which the negative-electrode material mixture layer is not applied, and a remaining portion is a negative-electrode coated portion applied with the negative-electrode material mixture layer; and a separator for insulating the positive electrode plate and the negative electrode plate, the positive electrode plate, the negative electrode plate, and the separator being wound in a flat form so that the positive-electrode uncoated portion and the negative-electrode uncoated portion protrude in opposite directions to each other, and the electrode wound body being sealed together with an electrolyte in a battery case,
wherein the lithium ion secondary battery includes:
a positive terminal connected to the positive-electrode uncoated portion; and
a negative terminal connected to the negative-electrode uncoated portion;
wherein the battery case has a flat rectangular shape in which one surface is a lid portion and two of surfaces excepting the lid portion are flat surfaces having a larger area than the other surfaces;
wherein the positive terminal and the negative terminal are placed to penetrate through the lid portion to partially protrude outside;
wherein assuming that a length of the electrode wound body in a winding axis direction is W, a size of the electrode wound body in a direction perpendicular to the winding axis direction and parallel to the flat surfaces is H, and a distance between a farthest position in a connecting range of at least one of the positive terminal and the negative terminal, in which the terminal is connected to the uncoated portion, from the lid portion and an edge of the electrode wound body on a side of the lid portion is X,
the values W, H, and X are determined so that a point defined in a plane (X/H, H/W) by a value (X/H) and a value (H/W) is located in a triangular region defined by joining three points, (0.50, 0.70), (0.32, 0.40), and (0.70, 0.40) in the same plane; and
wherein a battery capacity is 3 to 30 Ah, X/H is 0.3 to 0.4 or 0.6 to 0.7, and the value H is in a range of 40 mm≤H≤90 mm.

2. The lithium ion secondary battery according to claim 1, wherein
the positive terminal and the positive current collector are made of aluminum or aluminum alloy,
the negative terminal and the negative current collector are made of copper or copper alloy,
the positive terminal and the positive-electrode uncoated portion are connected by ultrasonic welding, and
the negative terminal and the negative-electrode uncoated portion are connected by resistance welding.

3. A lithium ion secondary battery comprising an electrode wound body including: a positive electrode plate in which a positive current collector is partially applied with a positive-electrode material mixture layer and has a positive-electrode uncoated portion on one end side in which the positive-electrode material mixture layer is not applied, and a remaining portion is a positive-electrode coated portion applied with the positive-electrode material mixture layer; a negative electrode plate in which a negative current collector is partially applied with a negative-electrode material mixture layer and has a negative-electrode uncoated portion on one end side in which the negative-electrode material mixture layer is not applied, and a remaining portion is a negative-electrode coated portion applied with the negative-electrode material mixture layer; and a separator for insulating the positive electrode plate and the negative electrode plate, the positive electrode plate, the negative electrode plate, and the separator being wound in a flat form so that the positive-electrode uncoated portion and the negative-electrode uncoated portion protrude in opposite directions to each other, and the electrode wound body being sealed together with an electrolyte in a battery case,
wherein the lithium ion secondary battery includes:
a positive terminal connected to the positive-electrode uncoated portion; and
a negative terminal connected to the negative-electrode uncoated portion;
wherein the battery case has a flat rectangular shape in which one surface is a lid portion and two of surfaces excepting the lid portion are flat surfaces having a larger area than the other surfaces;
wherein the positive terminal and the negative terminal are placed to penetrate through the lid portion to partially protrude outside;
wherein assuming that a length of the electrode wound body in a winding axis direction is W, a size of the electrode wound body in a direction perpendicular to the winding axis direction and parallel to the flat surfaces is H, and a distance between a farthest position in a connecting range of at least one of the positive terminal and the negative terminal, in which the terminal is connected to the uncoated portion, from the lid portion and an edge of the electrode wound body on a side of the lid portion is X,
the values W, H, and X are determined so that a point defined in a plane (X/H, H/W) by a value (X/H) and a value (H/W) is located in a triangular region defined by joining three points, (0.50, 0.70), (0.32, 0.40), and (0.70, 0.40) in the same plane; and
wherein a battery capacity is 3 to 30 Ah, X/H is 0.4 to 0.6, and the value H is in a range of 45 mm≤H≤120 mm.

4. The lithium ion secondary battery according to claim 3, wherein
the positive terminal and the positive current collector are made of aluminum or aluminum alloy,
the negative terminal and the negative current collector are made of copper or copper alloy,
the positive terminal and the positive-electrode uncoated portion are connected by ultrasonic welding, and
the negative terminal and the negative-electrode uncoated portion are connected by resistance welding.

5. A lithium ion secondary battery comprising an electrode wound body including: a positive electrode plate in which a positive current collector is partially applied with a positive-electrode material mixture layer and has a positive-electrode uncoated portion on one end side in which the positive-electrode material mixture layer is not applied, and a remaining portion is a positive-electrode coated portion applied with the positive-electrode material mixture layer; a negative electrode plate in which a negative current collector is partially applied with a negative-electrode material mixture layer and has a negative-electrode uncoated portion on one end side in which the negative-electrode material mixture layer is not applied, and a remaining portion is a negative-electrode coated portion applied with the negative-electrode material mixture layer; and a separator for insulating the positive electrode plate and the negative electrode plate, the positive electrode plate, the negative electrode plate, and the separator being wound in a flat form so that the positive-electrode uncoated portion and the negative-electrode uncoated portion protrude in opposite directions to each other, and the electrode wound body being sealed together with an electrolyte in a battery case, wherein the lithium ion secondary battery includes:
a positive terminal connected to the positive-electrode uncoated portion; and
a negative terminal connected to the negative-electrode uncoated portion;
wherein the battery case has a flat rectangular shape in which one surface is a lid portion and two of surfaces excepting the lid portion are flat surfaces having a larger area than the other surfaces;
wherein the positive terminal and the negative terminal are placed to penetrate through the lid portion to partially protrude outside;
wherein assuming that a length of the electrode wound body in a winding axis direction is W, a size of the electrode wound body in a direction perpendicular to the winding axis direction and parallel to the flat surfaces is H, and a distance between a farthest position in a connecting range of at least one of the positive terminal and the negative terminal, in which the terminal is connected to the uncoated portion, from the lid portion and an edge of the electrode wound body on a side of the lid portion is X,
the values W, H, and X are determined so that a point defined in a plane (X/H, H/W) by a value (X/H) and a value (H/W) is located in a triangular region defined by joining three points, (0.50, 0.70), (0.32, 0.40), and (0.70, 0.40) in the same plane; and
wherein the value of H is in a range of 45 mm≤H≤90 mm.

6. The lithium ion secondary battery according to claim 5, wherein
the positive terminal and the positive current collector are made of aluminum or aluminum alloy,
the negative terminal and the negative current collector are made of copper or copper alloy,
the positive terminal and the positive-electrode uncoated portion are connected by ultrasonic welding, and
the negative terminal and the negative-electrode uncoated portion are connected by resistance welding.

* * * * *